United States Patent
Stanley et al.

(10) Patent No.: US 11,758,069 B2
(45) Date of Patent: Sep. 12, 2023

(54) SYSTEMS AND METHODS FOR IDENTIFYING NON-COMPLIANT IMAGES USING NEURAL NETWORK ARCHITECTURES

(71) Applicant: Walmart Apollo, LLC, Bentonville, AR (US)

(72) Inventors: Theban Stanley, San Bruno, CA (US); Binwei Yang, Milpitas, CA (US); Cun Mu, Jersey City, NJ (US)

(73) Assignee: WALMART APOLLO, LLC, Bentonville, AR (US)

( * ) Notice: Subject to any disclaimer, the term of this patent is extended or adjusted under 35 U.S.C. 154(b) by 586 days.

(21) Appl. No.: 16/773,114

(22) Filed: Jan. 27, 2020

(65) Prior Publication Data

US 2021/0232620 A1    Jul. 29, 2021

(51) Int. Cl.
*G06V 10/40* (2022.01)
*G06V 10/764* (2022.01)
(Continued)

(52) U.S. Cl.
CPC ......... *H04N 1/32283* (2013.01); *G06F 16/53* (2019.01); *G06F 16/953* (2019.01);
(Continued)

(58) Field of Classification Search
CPC ........ G06N 3/0454; G06N 3/08; G06N 20/00; G06K 9/6267; G06V 10/82; G06V 10/20;
(Continued)

(56) References Cited

U.S. PATENT DOCUMENTS

| | | |
|---|---|---|
| 6,269,351 B1 | 7/2001 | Black |
| 6,904,168 B1 | 6/2005 | Steinberg et al. |

(Continued)

FOREIGN PATENT DOCUMENTS

| | | |
|---|---|---|
| CN | 101923652 | 12/2010 |
| EP | 1107130 | 6/2001 |

(Continued)

OTHER PUBLICATIONS

Indyk et al., "Approximate Nearest Neighbors: Towards Removing the Curse of Dimensionality," STOC '98: Proceedings of the 30th Annual ACM Symposium on Theory of Computing, May 1998, https://dl.acm.org/doi/proceedings/10.1145/276698, 1998.

(Continued)

*Primary Examiner* — Guillermo M Rivera-Martinez
(74) *Attorney, Agent, or Firm* — BRYAN CAVE LEIGHTON PAISNER LLP

(57) ABSTRACT

Systems and methods including one or more processors and one or more non-transitory storage devices storing computing instructions configured to run on the one or more processors and perform: receiving images at an electronic platform; generating, using a fingerprinting network associated with a neural network architecture, feature embeddings corresponding to the images; generating, using the fingerprinting network, codes based on the feature embeddings; storing the codes in one or more databases; receiving, using a search component associated with the electronic platform, a non-compliant image comprising non-compliant content; and searching the codes in the one or more databases to identify one or more of the images that include non-compliant content similar to, or the same as, the non-compliant content included in the non-compliant image. Other embodiments are disclosed herein.

20 Claims, 8 Drawing Sheets

(51) Int. Cl.
*G06V 10/82* (2022.01)
*H04N 1/32* (2006.01)
*G06F 16/53* (2019.01)
*G06F 16/953* (2019.01)
*G06N 3/04* (2023.01)

(52) U.S. Cl.
CPC ............... *G06N 3/04* (2013.01); *G06V 10/40* (2022.01); *G06V 10/764* (2022.01); *G06V 10/82* (2022.01)

(58) Field of Classification Search
CPC ............... G06V 30/413; G06V 20/698; G06T 2207/20081; G06T 2207/20084
See application file for complete search history.

(56) References Cited

U.S. PATENT DOCUMENTS

| | | | |
|---|---|---|---|
| 7,403,928 | B2 | 7/2008 | Chen |
| 7,751,592 | B1* | 7/2010 | Rosenberg ........... G06K 9/6293 709/224 |
| 7,831,530 | B2 | 11/2010 | Hashimoto |
| 8,086,039 | B2 | 12/2011 | Kletter |
| 8,234,168 | B1* | 7/2012 | Lagle Ruiz ........ G06Q 30/0267 705/14.64 |
| 8,374,974 | B2 | 2/2013 | Chen et al. |
| 8,411,964 | B2 | 4/2013 | Choi |
| 8,510,252 | B1* | 8/2013 | Gargi ................. G06K 9/00523 706/52 |
| 8,611,617 | B1 | 12/2013 | Baluja et al. |
| 8,644,606 | B2 | 2/2014 | White et al. |
| 9,418,458 | B2 | 8/2016 | Chertok et al. |
| 9,922,272 | B2 | 3/2018 | Cheng et al. |
| 10,225,086 | B2 | 3/2019 | Benchetrit et al. |
| 10,250,538 | B2 | 4/2019 | Prabhu |
| 10,346,969 | B1 | 7/2019 | Raghu et al. |
| 10,426,442 | B1 | 10/2019 | Schnorr |
| 10,664,722 | B1 | 5/2020 | Sharma et al. |
| 10,679,046 | B1 | 6/2020 | Black et al. |
| 10,769,524 | B1 | 9/2020 | Natesh |
| 2005/0160258 | A1 | 7/2005 | O'Shea et al. |
| 2008/0131005 | A1* | 6/2008 | Oliver ................. G06V 30/414 382/229 |
| 2008/0134282 | A1* | 6/2008 | Fridman ................ G06Q 10/10 726/1 |
| 2008/0159627 | A1 | 7/2008 | Sengamedu |
| 2011/0135204 | A1 | 6/2011 | Choi |
| 2011/0142346 | A1 | 6/2011 | Han et al. |
| 2012/0039539 | A1* | 2/2012 | Boiman ................. G11B 27/34 382/224 |
| 2013/0151609 | A1* | 6/2013 | Rubinstein ............. G06Q 10/10 709/204 |
| 2013/0188842 | A1* | 7/2013 | Hauke .................... G06F 16/583 382/115 |
| 2014/0201126 | A1* | 7/2014 | Zadeh ..................... A61B 5/165 706/52 |
| 2016/0275343 | A1* | 9/2016 | Dinerstein ........... G06V 40/162 |
| 2016/0294755 | A1 | 10/2016 | Prabhu |
| 2016/0314380 | A1* | 10/2016 | Abdulkader ......... G06K 9/6269 |
| 2016/0342859 | A1* | 11/2016 | Rajaram ................. G06T 7/162 |
| 2017/0061625 | A1 | 3/2017 | Estrada et al. |
| 2017/0177997 | A1 | 6/2017 | Karlinsky et al. |
| 2017/0287137 | A1 | 10/2017 | Lin et al. |
| 2018/0032840 | A1 | 2/2018 | Yu et al. |
| 2018/0129978 | A1 | 5/2018 | Vigoda et al. |
| 2018/0137390 | A1 | 5/2018 | Brundage et al. |
| 2018/0152402 | A1 | 5/2018 | Tsou |
| 2018/0211117 | A1 | 7/2018 | Ratti |
| 2018/0253866 | A1 | 9/2018 | Jain et al. |
| 2018/0276864 | A1 | 9/2018 | Hayashi |
| 2018/0285696 | A1 | 10/2018 | Eigen et al. |
| 2018/0307942 | A1 | 10/2018 | Pereira et al. |
| 2018/0349527 | A1 | 12/2018 | Li et al. |
| 2018/0349735 | A1 | 12/2018 | Lin et al. |
| 2019/0080456 | A1 | 3/2019 | Song et al. |
| 2019/0108396 | A1 | 4/2019 | Dal Mutto |
| 2019/0156202 | A1 | 5/2019 | Falk et al. |
| 2019/0163804 | A1 | 5/2019 | Linton et al. |
| 2019/0179796 | A1* | 6/2019 | Lakhman ............... G06N 20/00 |
| 2019/0197466 | A1 | 6/2019 | Hand, III et al. |
| 2019/0208412 | A1 | 7/2019 | Lord et al. |
| 2019/0245754 | A1 | 8/2019 | Greene, Jr. |
| 2019/0257767 | A1 | 8/2019 | Shaubi et al. |
| 2019/0297042 | A1* | 9/2019 | Prabhu ................ G06F 3/04842 |
| 2019/0325183 | A1 | 10/2019 | Tscherepanow et al. |
| 2019/0356956 | A1 | 11/2019 | Sheng et al. |
| 2019/0373322 | A1* | 12/2019 | Rojas-Echenique ........................ H04N 21/2187 |
| 2020/0005046 | A1* | 1/2020 | Attorre ............... G10L 15/1815 |
| 2020/0092607 | A1 | 3/2020 | Rechner et al. |
| 2020/0097724 | A1 | 3/2020 | Chakravarty et al. |
| 2020/0099783 | A1 | 3/2020 | Liu et al. |
| 2020/0125639 | A1 | 4/2020 | Doyle |
| 2020/0125888 | A1 | 4/2020 | Hacker |
| 2020/0125928 | A1 | 4/2020 | Doyle |
| 2020/0126533 | A1 | 4/2020 | Doyle et al. |
| 2020/0151521 | A1 | 5/2020 | Almazan |
| 2020/0154078 | A1* | 5/2020 | Ahn ...................... G06N 20/00 |
| 2020/0160612 | A1 | 5/2020 | Bowen |
| 2020/0162412 | A1* | 5/2020 | Mei ........................ G06N 3/084 |
| 2020/0242395 | A1 | 7/2020 | Kumar |
| 2020/0242407 | A1 | 7/2020 | Gandhi |
| 2020/0242733 | A1 | 7/2020 | Kumar |
| 2021/0204553 | A1 | 7/2021 | Mehta |

FOREIGN PATENT DOCUMENTS

| | | |
|---|---|---|
| WO | 2017020515 | 2/2017 |
| WO | 2017214970 | 12/2017 |

OTHER PUBLICATIONS

Simonyan et al., "Very Deep Convolutional Networks for Large-Scale Image Recognition," Proceedings of ICLR, 2015, arXiv:1409.1556v6 [cs.CV], https://arxiv.org/pdf/1409.1556.pdf, 2015.

Mu et al., "Fast and Exact Nearest Neighbor Search in Hamming Space on Full-Text Search Engines," Proceedings of SISAP, 2019, arXiv:1902.08498v2 [cs.IR], https://arxiv.org/abs/1902.08498, 2019.

Neurohive, "VGG16—Convolutional Network for Classification and Detection," https://neurohive.io/en/popular-networks/vgg16/, accessed Apr. 27, 2020.

Van Durme et al., "Online Generation of Locality Sensitive Hash Signatures," http://www.cs.jhu.edu/~vandurme/papers/VanDurmeLal-lACL10-slides.pdf, accessed Apr. 27, 2020.

* cited by examiner

SYSTEMS AND METHODS FOR IDENTIFYING NON-COMPLIANT IMAGES USING NEURAL NETWORK ARCHITECTURES

TECHNICAL FIELD

This disclosure relates generally to systems and methods for identifying non-compliant images using neural network and machine learning technologies.

BACKGROUND

Many entities provide electronic platforms that store large collections of images in connection with providing products and/or services to customers. These entities often desire to remove, or restrict access to, images including content that is not compliant with policies set forth by the entities. For example, it may be desired to remove or restrict access to images that include various types of offensive content, such as nudity, sexually explicit content, racist content, racially inappropriate content, and weapons.

A variety of technical obstacles make it difficult to remove images that include non-compliant content. One technical problem relates to accurately identifying images that include the non-compliant content. While this task can be performed manually for small collections of images, manually reviewing large collections of images (e.g., in the thousands, millions, or hundreds of millions) is often not possible. Although advances in computer vision applications have made significant improvements in understanding image content, existing computer vision applications are not capable of efficiently storing, analyzing, and searching very large collections of images due to storage and processing constraints.

BRIEF DESCRIPTION OF THE DRAWINGS

To facilitate further description of the embodiments, the following drawings are provided in which.

Figure 1:
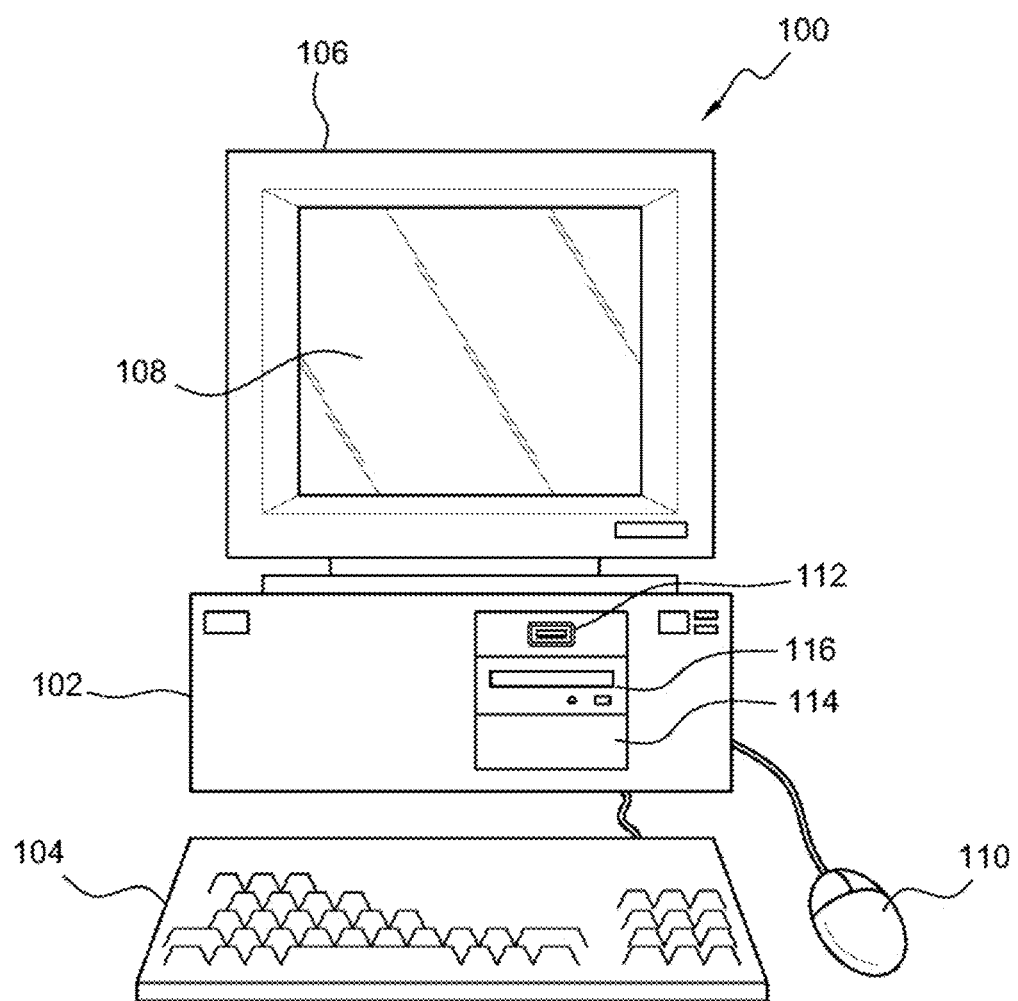
FIG. 1 illustrates a front elevational view of a computer system that is suitable for implementing various embodiments of the systems, architectures, and methods disclosed in FIGS. 3-8.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processors and one or more non-transitory computer-readable storage devices storing computing instructions. The computing instructions can be configured to run on the one or more processors and perform acts of: receiving images at an electronic platform; generating, using a fingerprinting network associated with a neural network architecture, feature embeddings corresponding to the images; generating, using the fingerprinting network, codes based on the feature embeddings; storing the codes in one or more databases; receiving, using a search component associated with the electronic platform, a non-compliant image comprising non-compliant content; and searching the codes in the one or more databases to identify one or more of the images that include non-compliant content similar to, or the same as, the non-compliant content included in the non-compliant image.

Various embodiments include a method. The method can be implemented via execution of computing instructions configured to run at one or more processors and configured to be stored at non-transitory computer-readable media The method can comprise receiving images at an electronic platform; generating, using a fingerprinting network associated with a neural network architecture, feature embeddings corresponding to the images; generating, using the fingerprinting network, codes based on the feature embeddings; storing the codes in one or more databases; receiving, using a search component associated with the electronic platform, a non-compliant image comprising non-compliant content; and searching the codes in the one or more databases to identify one or more of the images that include non-compliant content similar to, or the same as, the non-compliant content included in the non-compliant image.

Figure 2:
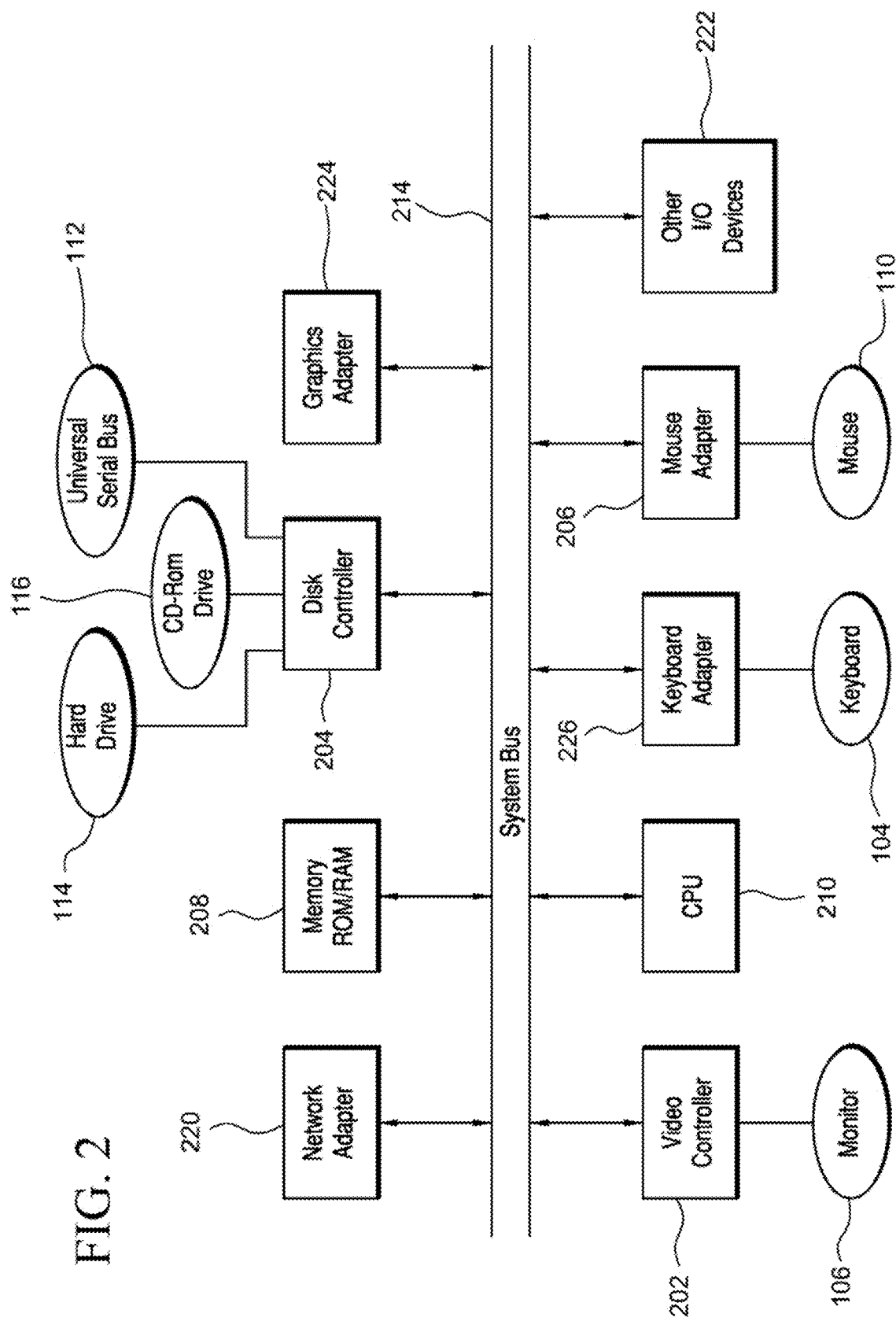
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In many embodiments, all or a portion of memory storage unit 208 can be referred to as memory storage module(s) and/or memory storage device(s). In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
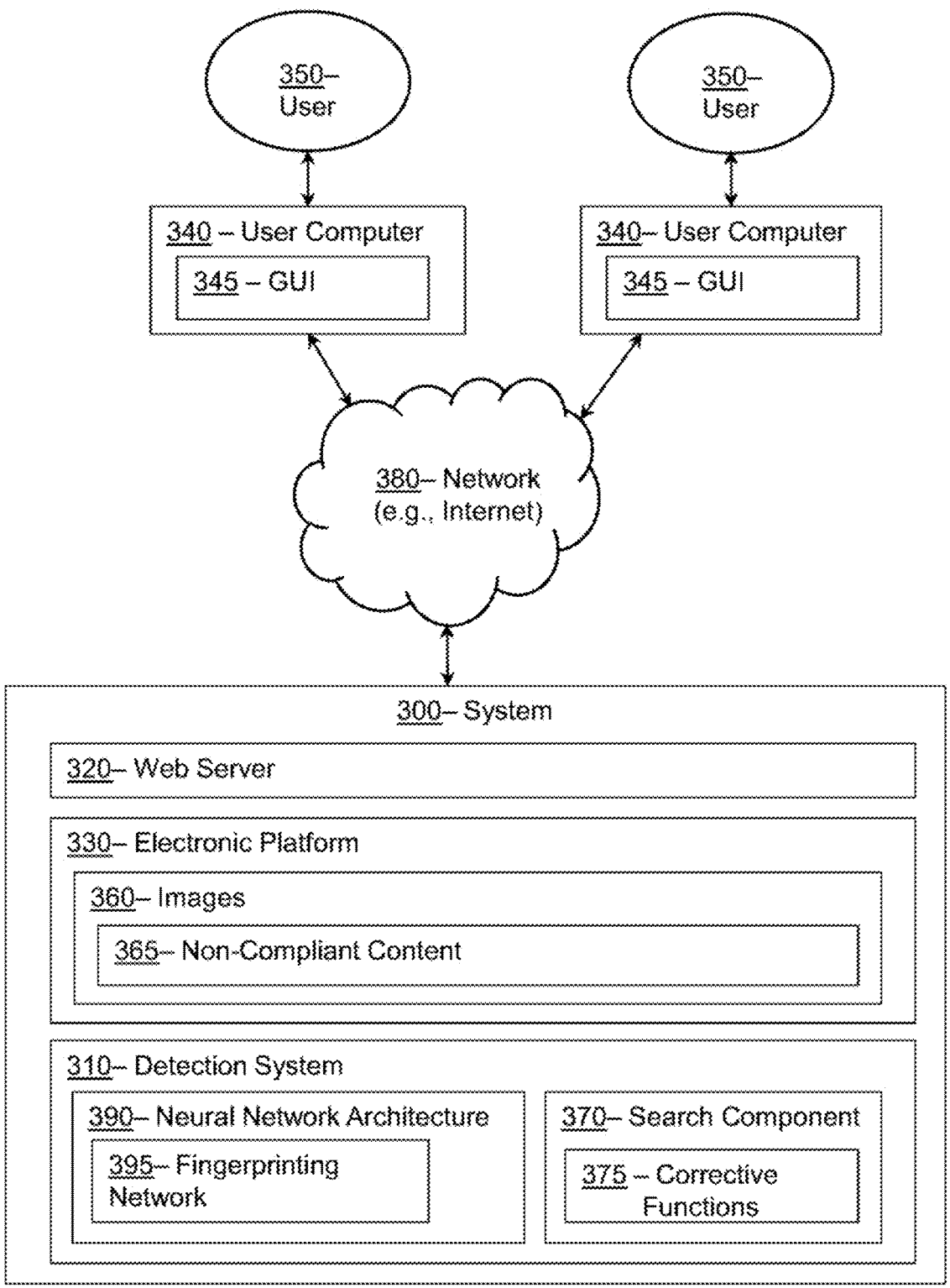
FIG. 3 illustrates a representative block diagram of a system according to certain embodiments.

Turning ahead in the drawings, FIG. 3 illustrates a block diagram of a system 300 that can be employed for searching and identifying non-compliant images, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a detection system 310, web server 320, and/or electronic platform 330. The detection system 310, web server 320, and/or electronic platform 330 can each be a separate computer system, such as computer system 100 (FIG. 1), as described above, and can each be a single computer, a single server, or a cluster or collection of computers or servers, or a cloud of computers or servers. In another embodiment, a single computer system can host each of two or more of the detection system 310, web server 320, and electronic platform 330. Additional details regarding the detection system 310, web server 320, and electronic platform 330 are described herein.

In many embodiments, system 300 also can comprise user computers 340. In other embodiments, user computers 340 can be external to system 300. User computers 340 can comprise any of the elements described in relation to computer system 100. In some embodiments, user computers 340 can be mobile devices. A mobile device can refer to a portable electronic device (e.g., an electronic device easily conveyable by hand by a person of average size) with the capability to present audio and/or visual data (e.g., text, images, videos, music, etc.). For example, a mobile device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can comprise a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile device, and vice versa. However, a wearable user computer device does not necessarily comprise a mobile device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100 ™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In many embodiments, system 300 can comprise graphical user interfaces ("GUIs") 345. In the same or different embodiments, GUIs 345 can be part of and/or displayed by computing devices associated with system 300 and/or user computers 340, which also can be part of system 300. In some embodiments, GUIs 345 can comprise text and/or graphics (images) based user interfaces. In the same or different embodiments, GUIs 345 can comprise a heads up display ("HUD"). When GUIs 345 comprise a HUD, GUIs 345 can be projected onto glass or plastic, displayed in midair as a hologram, or displayed on monitor 106 (FIG. 1). In various embodiments, GUIs 345 can be color or black and white. In many embodiments, GUIs 345 can comprise an application running on a computer system, such as computer system 100, user computers 340, and/or system 300. In the same or different embodiments, GUI 345 can comprise a website accessed through network 380 (e.g., the Internet). In some embodiments, GUI 345 can comprise an eCommerce website. In the same or different embodiments, GUI 345 can be displayed as or on a virtual reality (VR) and/or augmented reality (AR) system or display.

In some embodiments, web server 320 can be in data communication through network 380 (e.g., the Internet) with user computers (e.g., 340). In certain embodiments, user computers 340 can be desktop computers, laptop computers, smart phones, tablet devices, and/or other endpoint devices. Web server 320 can host one or more websites. For example, web server 320 can host an eCommerce website that allows users to browse and/or search for products, to add products to an electronic shopping cart, and/or to purchase products, in addition to other suitable activities.

In many embodiments, the detection system 310, web server 320, and/or electronic platform 330 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of the detection system 310, web server 320, and/or electronic platform 330 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of the detection system 310, web server 320, and/or electronic platform 330. In a similar manner, the processing module(s) and the memory storage module(s) can be local and/or remote to each other.

In many embodiments, the detection system 310, web server 320, and/or electronic platform 330 can be configured to communicate with one or more user computers 340. In some embodiments, user computers 340 also can be referred to as customer computers. In some embodiments, the detection system 310, web server 320, and/or electronic platform 330 can communicate or interface (e.g., interact) with one or more customer computers (such as user computers 340) through a network 380 (e.g., the Internet). Network 380 can be an intranet that is not open to the public. Accordingly, in many embodiments, the detection system 310, web server 320, and/or electronic platform 330 (and/or the software used by such systems) can refer to a back end of system 300 operated by an operator and/or administrator of system 300, and user computers 340 (and/or the software used by such systems) can refer to a front end of system 300 used by one or more users 350, respectively. In some embodiments, users 350 can also be referred to as customers, in which case, user computers 340 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, the detection system 310, web server 320, and/or electronic platform 330 also can be configured to communicate with one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, IBM DB2 Database, and/or NoSQL Database.

Meanwhile, communication between the detection system 310, web server 320, and/or electronic platform 330, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

In certain embodiments, the electronic platform 330 is configured to provide a website for an online retailer or online shopping site that enables users 350 to browse offerings (e.g., products and/or services), place orders, make purchases, access online accounts, and perform other related activities over the network 380. The electronic platform 330 can include one or more databases that store information associated with the products and/or services, as well as images 360 corresponding to the products and/or services. When users 350 access the website hosted by the electronic platform 330, the electronic platform 330 can display products and/or services, as well as images 360 associated with the products and/or services.

Detection system 310 can be configured to perform functions associated with detecting images 360 that include non-compliant content 365, as well as executing corrective measures for managing images that include non-compliant content 365. In certain embodiments, the non-compliant content 365 can include content that is determined to be offensive, crude, hateful, and/or distasteful. For example, non-compliant content 365 in the images 360 can include nudity, sexually explicit content, racist content, racially inappropriate content, weapons (e.g., assault weapons), toys designed as assault weapons, offensive text (e.g., including crude, vulgar, expletive words or phrases), and other types of content. The types or categories of non-compliant content 365 can vary greatly, and can generally include any content that an individual or entity desires to remove from the electronic platform 330 and/or restrict access to on the electronic platform 330.

The detection system 310 can store and execute various functions for detecting non-compliant content 365 in the images 360. In certain embodiments, the detection system 310 comprises a neural network architecture 390 that is trained to perform various functions associated with detecting the non-compliant content 365 in the images 360. Generally speaking, any type of neural network architecture 390 can be employed to detect non-compliant content 365 in the images 360 and the configuration of the neural network architecture 390 can vary.

In certain embodiments, the neural network architecture 390 can comprise one or more neural networks that are trained to perform functions associated with detecting non-compliant content 365 in the images 360. The neural networks can include convolutional neural networks (CNNs). Each neural network can be configured to analyze images 360 and to execute deep learning functions and/or machine learning functions on the images 360. Each neural network can include a plurality of layers including, but not limited to, one or more input layers, one or more output layers, one or more convolutional layers (e.g., that include learnable filters), one or more ReLU (rectifier linear unit) layers, one or more pooling layers, one or more fully connected layers, one or more detection layers, one or more upsampling layers, one or more normalization layers, etc. The neural networks and their corresponding layers can be configured in a manner that enables the neural networks to learn and execute various functions for analyzing, interpreting, and understanding the content of the images 360. The functions learned by the neural networks associated with the neural network architecture 390 can include computer vision functions that involve extracting feature information from the images 360. In certain embodiments, functions learned by the neural networks can also include functions for performing the object detection, object classification, and/or image classification. Appropriate loss functions can be learned to optimize the neural networks during training.

Many online retailers or online shopping sites store large numbers of images 360 associated with providing products and/or services. The number of images 360 stored on these platforms can be in the thousands or millions and, in some cases, can even exceed 100,000,000. This large number of images 360 can create technical obstacles for identifying images 360 that include non-compliant content 365. One technical obstacle relates to identifying images 360 comprising non-compliant content 365 in large datasets with high accuracy. Moreover, because searching large datasets of images can be very expensive in terms of both time and computational resources, another technical obstacle relates to providing a search mechanism that enables large datasets to be quickly and efficiently searched, while minimizing storage of data that is utilized to facilitate such searches.

For example, consider a scenario in which a database stores more than 100,000,000 images 360, and the goal is to determine whether any of images 360 includes one or more categories of non-compliant content 365 (e.g., such as nudity, sexually explicit content, racist content, racially inappropriate content, weapons, etc.). One potential solution could be to train a neural network architecture 390 to generate and store dense feature embeddings for each of the images 360. Users could then provide or submit an image 360 including non-compliant content 365, and a dense feature embedding generated for this image 360 could be compared with the stored feature embeddings to identify candidate images comprising non-compliant content 365. However, in many scenarios, this technique may not be feasible due to the large storage capacity that may be required to store dense feature embeddings for each of the images 360. Additionally, this technique may not be feasible due to large amount of time and processing that would be required to compare the dense feature embeddings. Thus, due to the large size of the data collection, the storage and processing capacities required to analyze the images 360 for non-compliant content 365 can be very expensive and, in many cases, prohibitive.

To overcome the technical challenges mentioned above, certain embodiments of the neural network architecture 390 can utilize a fingerprinting network 395 to facilitate detection of non-compliant content 365 in large collections of images 360. In certain embodiments, the fingerprinting network 395, inter alia, can be configured to extract feature embeddings from each of the images 360 and to convert the feature embeddings into binary codes. In some embodiments, the feature embeddings are converted into codes other than binary codes, such as indexing codes, vector codes, or integer codes. The binary codes can then be stored and utilized to facilitate searching images 360 that include non-compliant content 365. This fingerprinting technique avoids the large storage capacities needed for storing the dense feature embeddings. In addition, it permits searches to be performed quickly and efficiently on a very large collection of images 360. For example, a search may be performed quickly by comparing stored binary codes associated with a collection of images 360 with binary codes that are derived from an image 360 including non-compliant content 365 that is a target of a particular search. Furthermore, because the binary codes can be generated in a manner that preserves the salient feature information included in the dense embeddings, images 360 that include non-complaint content 365 can be identified with high accuracy. As examples, salient features can include various objects that located in foreground portions of the images and/or noticeable or prominent objects included in the images, and salient feature information can include information about those salient features.

The search component 370 enables a user to search for images 360 that include non-compliant content 365. In certain embodiments, the search component 370 can enable a user 350 to submit an example of an image 360 that includes a particular type or category of non-compliant content 365 (also referred to herein as a "seed image"). For example, an exemplary seed image may include non-compliant content 365 relating to a particular logo, slogan, or product that is determined to be offensive. After the seed image submitted by the user 350 is converted to binary codes, the binary codes associated with the seed image can then be compared to the binary codes stored for the large collection of images 360 to enable quick and efficient identification of images 360 that include the same or similar non-compliant content 365 that is included in the seed image. In certain embodiments, any images 360 identified by the search component 370 as potentially including non-compliant content 365 can be presented to a user 350 on an interface or GUI 345 of user computer 340 to enable the user to confirm or deny the presence of non-compliant content 365 in the images 360. The search component 370 can enable images 360 to be searched in other ways as well.

A variety of corrective functions 375 can be executed in response to detecting non-compliant content 380 in one or more of the images 360. The corrective functions 375 may be executed automatically by the detection system 310 and/or in response to selections made by users 350 via interfaces provided by the search component 370. In certain embodiments, the corrective functions 375 can include removing or deleting images 360 with non-compliant content 380 from a database and/or the electronic platform 330. The corrective functions 375 can additionally, or alternatively, include preventing the images 360 with the non-compliant content 365 from being accessible on the electronic platform 330, limiting access to the images 360, flagging the images 360 for human review, and/or editing the images 360 (e.g., to remove the non-compliant content 380 or to block the non-compliant content 380) and allowing the edited version of the first one of images 375 to be accessible to the electronic platform 325. Other types of corrective functions 375 may also be executed by detection system 310.

The images 360 provided to, and analyzed by, the detection system 310 can include any type of image. In certain embodiments, the images 360 can include one or more two-dimensional (2D) images. In certain embodiments, the images 360 may include one or more three-dimensional (3D) images. The images 360 may be captured in any digital or analog format, and using any color space or color model. Exemplary image formats can include, but are not limited to, JPEG (Joint Photographic Experts Group), TIFF (Tagged Image File Format), GIF (Graphics Interchange Format), PNG (Portable Network Graphics), etc. Exemplary color spaces or models can include, but are not limited to, sRGB (standard Red-Green-Blue), Adobe RGB, gray-scale, etc.

The images 360 received by the detection system 310 can be captured by any type of camera device. The camera devices can include any devices that include an imaging sensor, camera or optical device. For example, the camera devices may represent still image cameras, video cameras, and/or other devices that include image/video sensors. The camera devices can also devices that include imaging sensors, cameras or optical devices and which are capable of performing other functions unrelated to capturing images. For example, the camera devices can include mobile devices (e.g., smart phones or cell phones), tablet devices, computing devices, desktop computers, etc. The camera devices can be equipped with analog-to-digital (ND) converters and/or digital-to-analog (D/A) converters based on 360 configuration or design of the camera devices.

Each of the images 360 (or the corresponding scenes captured in the images 360) can include one or more objects. Generally speaking, any type of object may be included in an image 360, and the types of objects included in an image can vary greatly. The objects included in an image 360 may correspond to various types of inanimate articles (e.g., apparel, computing equipment, vehicles, beds, desks, windows, tools, appliances, industrial equipment, curtains, sporting equipment, fixtures, etc.), living things (e.g., human beings, animals, plants, etc.), structures (e.g., buildings, houses, etc.), and/or the like. In some cases, the objects included in the images may relate to non-compliant content 365, and the detection system 310 can permit searches to be conducted for identifying the non-compliant content.

Figure 4:
FIG. 4 illustrates a representative block diagram of a portion of the system of FIG. 3 according to certain embodiments.

FIG. 4 is a block diagram illustrating a detailed view of an exemplary system 300 in accordance with certain embodiments. The system 300 includes one or more storage modules 401 that are in communication with one or more processing modules 402. The one or more storage modules 401 can include: (i) non-volatile memory, such as, for example, read-only memory (ROM) or programmable read-only memory (PROM); and/or (ii) volatile memory, such as, for example, random access memory (RAM), dynamic RAM (DRAM), static RAM (SRAM), etc. In these or other embodiments, storage modules 401 can comprise (i) non-transitory memory and/or (ii) transitory memory. The one or more processing modules 402 can include one or more central processing units (CPUs), graphical processing units (GPUs), controllers, microprocessors, digital signal processors, and/or computational circuits. The one or more storage modules 401 can store data and instructions associated with providing a detection system 310, web server 320 (FIG. 3), and electronic platform 330. The one or more processing modules 402 are configured to execute instructions associated with these components. Exemplary configurations for each of these components are described in further detail below.

The electronic platform 330 can include and/or communicate with one or more databases 410. The one or more databases 410 store images 360, for example, which may be associated with products and/or services offered through the electronic platform 330. One or more of the images 360 can include non-compliant content 365. The one or more databases 410 also store codes, including binary codes 435, that are derived from, or associated with, the images 360.

The neural network architecture 390 of the detection system 310 includes a fingerprinting network 395 and a search component 370. In certain embodiments, the fingerprinting network 395 can be configured to preprocess images 360 associated with the electronic platform 360 by generating binary codes 435 corresponding to the images 360 and storing the binary codes 435 in the one or more databases 410. The search component 370 can then be utilized to conduct searches on the stored binary codes 435 to identify images 360 comprising non-compliant content 365.

In certain embodiments, the fingerprinting network 395 can include a feature extraction network 420 and a binarization component 430 for performing the preprocessing operations on the images 360. The configurations of the feature extraction network 420 and the binarization component 430 can vary.

In certain embodiments, the feature extraction network 420 can represent a CNN that is configured to extract and/or generate feature embeddings 425 from the images 360. The feature extraction network 420 can be implemented using a deep learning network that is trained to extract the feature embeddings 425. In some embodiments, the feature extraction network 420 can be implemented using VGG-16 developed by Visual Geometry Group ("VGG"). Other deep learning networks may also be utilized to generate feature embeddings 425 from the images 360. For example, in certain embodiments, the feature extraction network 420 can generate the feature embeddings 425 using a version of ResNet (Residual Neural Network), EfficientNet, or other similar convolutional neural network. In certain embodiments, the feature extraction network 420 can alternatively, or additionally, be implemented using a shallow network such as pHash (perceptual hashing), wHash (wavelet hashing), dHash (difference hashing), aHash (average hashing), or other similar hashing network or function.

One of ordinary skill would recognize that the choice of selecting a deep neural network or shallow network often represents a tradeoff in terms of accuracy versus speed. Thus, in certain embodiments, the feature extraction network 420 may be implemented using a deep learning network for scenarios in which accuracy is more important than speed. On the other hand, a shallow network may be utilized for scenarios in which speed is more important than accuracy.

Regardless of its implementation, the feature extraction network 420 may be configured to receive the images 360 provided to the electronic platform 330 and generate a feature embedding 425 corresponding to each of the images 360. In certain embodiments, the feature extraction network 420 can be trained to generate the feature embeddings 425, which comprise dense feature information, using various supervised, semi-supervised, and/or unsupervised training techniques In certain embodiments, the feature embeddings 425 can include multi-dimensional vectors that are derived from raw data associated with the images 360. To generate the feature embeddings 425 and/or associated multi-dimensional vectors, the raw data of the images 360 may be represented in an embedding space having reduced dimensionality. The feature embeddings 425, or their corresponding multi-dimensional vectors, may be utilized to represent the salient or prominent features in the image 360 and/or capture semantic information corresponding to the images 360. For example, the feature embeddings 425 may be generated in a manner that decreases distances (e.g., Euclidian distances) between semantically similar images 360 and increases distances between semantically dissimilar images 360.

Figure 5:
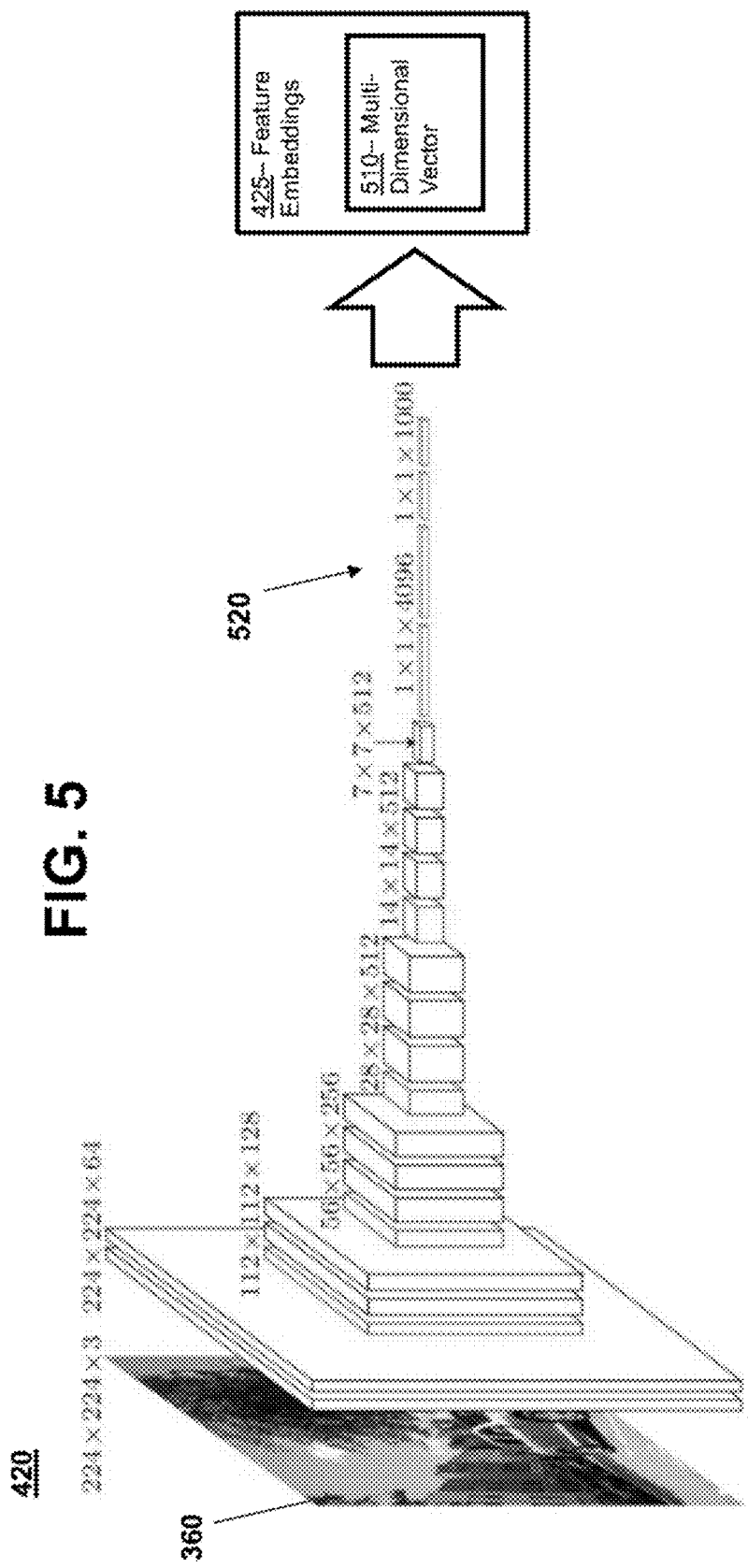
FIG. 5 illustrates a block diagram for an exemplary feature extraction network.

FIG. 5 discloses an exemplary architecture for a feature extraction network 420 that is implemented, at least in part, using VGG-16. The feature extraction network 420 can receive images 360 that are stored on, or provided to, the electronic platform 330 (FIGS. 3-4), and can extract feature embeddings 425 from the images 360. As mentioned above, a feature embedding 425 for an image 360 may include a multi-dimensional vector 510 that captures feature information included in the image 360. In certain embodiments in which the feature extraction network 420 that is implemented using VGG-16, the feature embeddings 425 may be extracted from one or more the fully-connected layers 520 located toward the output side (right side) of the VGG-16 network. Other deep or shallow networks may also be utilized to extract or generate the feature embeddings 425 as mentioned above.

Returning to FIG. 4, the binarization component 430 can receive the feature embeddings 425 generated by the feature extraction network 420, and can convert each of the feature embeddings 425 to a plurality of binary codes 435. The binary codes 435 associated with the images 360 can be generated in a manner that preserves the salient or prominent feature information captured by the feature embeddings 425. In addition to minimizing storage of the system, the binary codes 435 can enable searches for images 360 including non-compliant content 365 to be performed rapidly and efficiently.

The manner in which the binary codes 435 are generated by the binarization component 430 can vary. In certain embodiments, the binarization component 430 may execute a hyperplane hashing function 450 to generate one or more binary codes 435 for each of the images 360. For each feature embedding 425, the hyperplane hashing function 450 can be configured to divide or split the multi-dimensional embedding space associated with the feature embedding 425 into a plurality of segments or buckets. For example, the hyperplane hashing function 450 can divide the embedding space using randomly generated hyperplanes. A separate binary code 435 can be generated for each hyperplane and/or segment of the embedding space.

In certain embodiments, the hyperplane hashing function 450 may utilize locality sensitive hashing (LSH) to generate the binary codes 435 corresponding to each hyperplane and/or segment of the embedding space. The LSH can be advantageous because it allows an approximate nearest neighbor search to be performed quickly on the feature embeddings 425 to reduce the computation complexity of the feature embeddings 425, while preserving the spatiality of the feature embeddings 425. The LSH can be utilized to derive a binary code (e.g., 0 or 1) for each hyperplane of a feature embedding 425. The binary codes 435 for each of the hyperplanes can then be used to collectively represent the feature embedding 425 (or its corresponding image 330), and to facilitate searches.

Other techniques may also be utilized to generate the binary codes 435 corresponding to the images 360. Regardless of how the binary codes 435 are generated, the binary codes 435 can be stored in the one or more databases 410 and utilized to facilitate searches on corresponding images 360 including searches for identifying images 360 that include non-compliant content 365.

Figure 6:
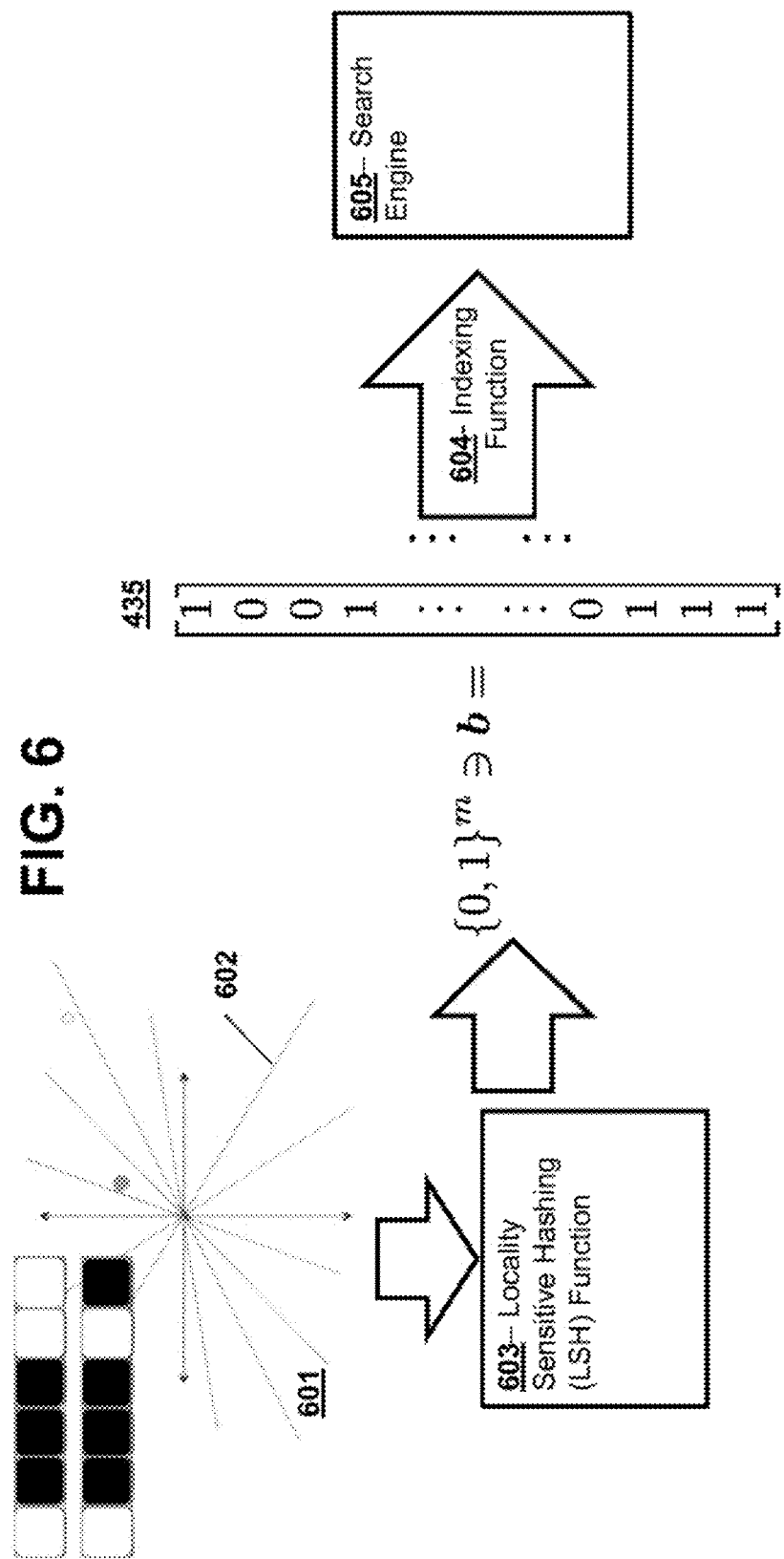
FIG. 6 illustrates a flow diagram for an exemplary binarization component.

FIG. 6 a diagram illustrating an exemplary technique for implementing a hyperplane hashing function 450 (FIG. 4) according to certain embodiments. The hyperplane hashing function 450 (FIG. 4) can generate binary codes 435 corresponding to images and/or feature embeddings derived from the images. As explained above, the binary codes 435 can be utilized to perform searches on images 360 (FIGS. 3 & 4) (e.g., searches to identify images with non-compliant content).

For each feature embedding, a multi-dimensional embedding space 601 associated with the feature embedding 425 (FIG. 4) can be divided into a plurality of segments using randomly chosen hyperplanes 602. A LSH function 603 can be used to generate binary codes corresponding the various hyperplanes 602 and/or segments of the embedding space 601. That is, for each hyperplane 602 and/or segment of the embedding space 601, the LSH function 603 can derive a binary code (e.g., 0 or 1).

In certain embodiments, the binary codes 435 derived from each feature embedding can then be provided to an indexing function 604, which segments the binary codes 435 into a plurality of sub-codes. The sub-codes can then be stored to enable searching by a search engine 605. The search engine 605 can include various algorithms that enable searching of the sub-codes. In certain embodiments, the search engine 605 may be implemented, at least in part, using the Elasticsearch search engine.

Returning to FIG. 4, the search component 370 can enable users to execute various searches on the images 360 stored in the one or more databases 410. The search component 370 may include, or communicate with, a search engine (e.g., search engine 605 in FIG. 6) to identify relevant images based on binary codes 435 (or corresponding sub-codes) that are derived from the images 360.

The search component 370 may provide one or more search interfaces 440 to assist users with performing searches on the images 360, including searches for identifying images 360 that include non-compliant content 365. The search interfaces 440 may be displayed on user computers 340 (FIG. 3) and may be accessible over the network 380 (FIG. 3).

In certain embodiments, the search interfaces 440 may enable a user seeking to identify images 360 with non-compliant content 365 to upload or provide a seed image that includes non-compliant content 365. Using the feature extraction network 420 and binarization component 430 of the fingerprinting network 395, binary codes 435 can be generated for the seed image in the same manner as discussed above (e.g., using LSH with random hyperplane projection techniques).

The binary codes 435 associated with the seed image can then be utilized to search for images 360 comprising non-compliant content 365 which is the same as, or similar to, the non-compliant content 365 included in the seed image. In certain embodiments, this may involve comparing the binary codes 435 (or corresponding sub-codes) associated with the seed image to the binary codes 435 (or corresponding sub-codes) stored in the one or more databases 410. In certain embodiments, one or more nearest neighbor search (NNS) algorithms or methods may be utilized on the binary codes 435 to identify images that are similar to the seed image. Any known NNS algorithm or method (e.g., k-nearest neighbor, approximate nearest neighbor, nearest neighbor distance ratio, fixed-radius near neighbors, all nearest neighbors, etc.) may be employed.

The search interfaces 440 can include a variety of searching options and filters to enable searching of the images 360 stored on the electronic platform 330. For example, in certain embodiments, the search interfaces 440 may provide options or filters for searching images corresponding to particular types of products and/or services (e.g., for searching images corresponding to offerings for apparel, furniture, healthcare services, etc.).

In certain embodiments, the search interfaces 440 may further include multi-modal search options 445 for searching the images. Generally speaking, the multi-modal search options 445 can include any search option or filter that enables the images 360 to be searched using two or more types of content. Exemplary content that may utilized to perform multi-modal searches can include any or all of the following: text, images, videos, documents, and/or audio. For example, according to certain embodiments, the multi-modal search options 445 can enable users to search for images 360 having non-compliant content 365 using both image content (e.g., content of a seed image) and text content (e.g., text describing a category or type of product and/or service).

Figure 7:
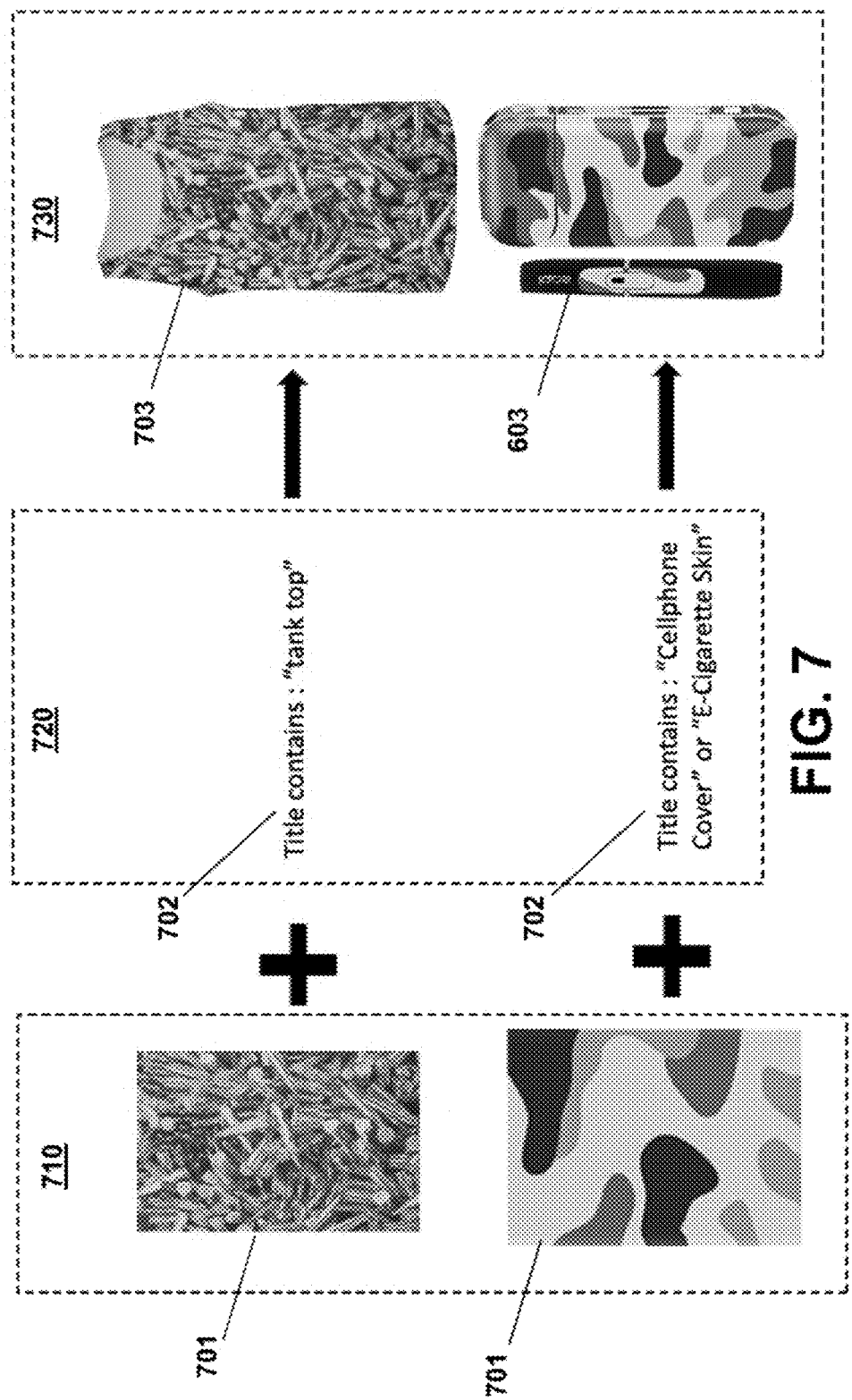
FIG. 7 illustrates an exemplary technique for conducting a multi-modal search according to certain embodiments.

FIG. 7 illustrates two exemplary multi-modal searches that may be executed using multi-modal search options 445 (FIG. 4) to identify images including non-compliant content. Block 710 includes two exemplary non-compliant images 701 (or "seed images") that may be input by a user via a search interface 440 (FIG. 4). The exemplary non-compliant images 701 include content that is determined to be non-compliant or offensive (e.g., camouflage patterns and images of bullets or ammunition). The non-compliant images 701 can be provided as part of a search query to identify images that include the same or similar non-compliant content.

Block 720 includes exemplary text strings 702 (e.g., "tank tops," "cell phone cover," and "e-cigarette skin") that can be submitted with the search query. The exemplary text strings 702 can be utilized to search for specific types of products and/or services that include the non-compliant content, thus narrowing or further customizing the search query for images that include non-compliant content.

Block 730 includes exemplary search results 703 comprising other non-compliant images that correspond to the search query. The search results 703 can be identified using the multi-modal content comprising the non-compliant images 701 and text strings 702 specified in blocks 710 and 720, respectively. For example, the binary codes 435 associated with the non-compliant images 701 may be compared to stored binary codes 435 (FIGS. 4 & 6) for other images to identify the search results 703, and the text strings 702 can be used to search for particular non-compliant images corresponding to specific types or categories of products and/or services. The search results 703 can then be displayed to a user on a search interface 440 (FIG. 4), which permits the user to execute various corrective functions 375 (FIGS. 3-4) to prevent, limit, and/or manage access to the non-compliant images 703.

In addition to identifying non-compliant content that is identical to that which is depicted in seed images (e.g., the non-compliant images 701 in block 710), the search results 703 identified using the techniques described herein can comprise images that include non-compliant content which is similar to the seed images. For example, given a seed image that identities an AR-15 assault rifle, the search results 703 may include images that identify AR-15 assault rifles having different sizes, shapes, colors, poses, and/or perspectives, and may also identify other types of guns that have a similar shape and/or appearance. Thus, the detection techniques described herein can be used to identify candidate images having non-compliant content that is not identical to that which is depicted in seed images.

Figure 8:
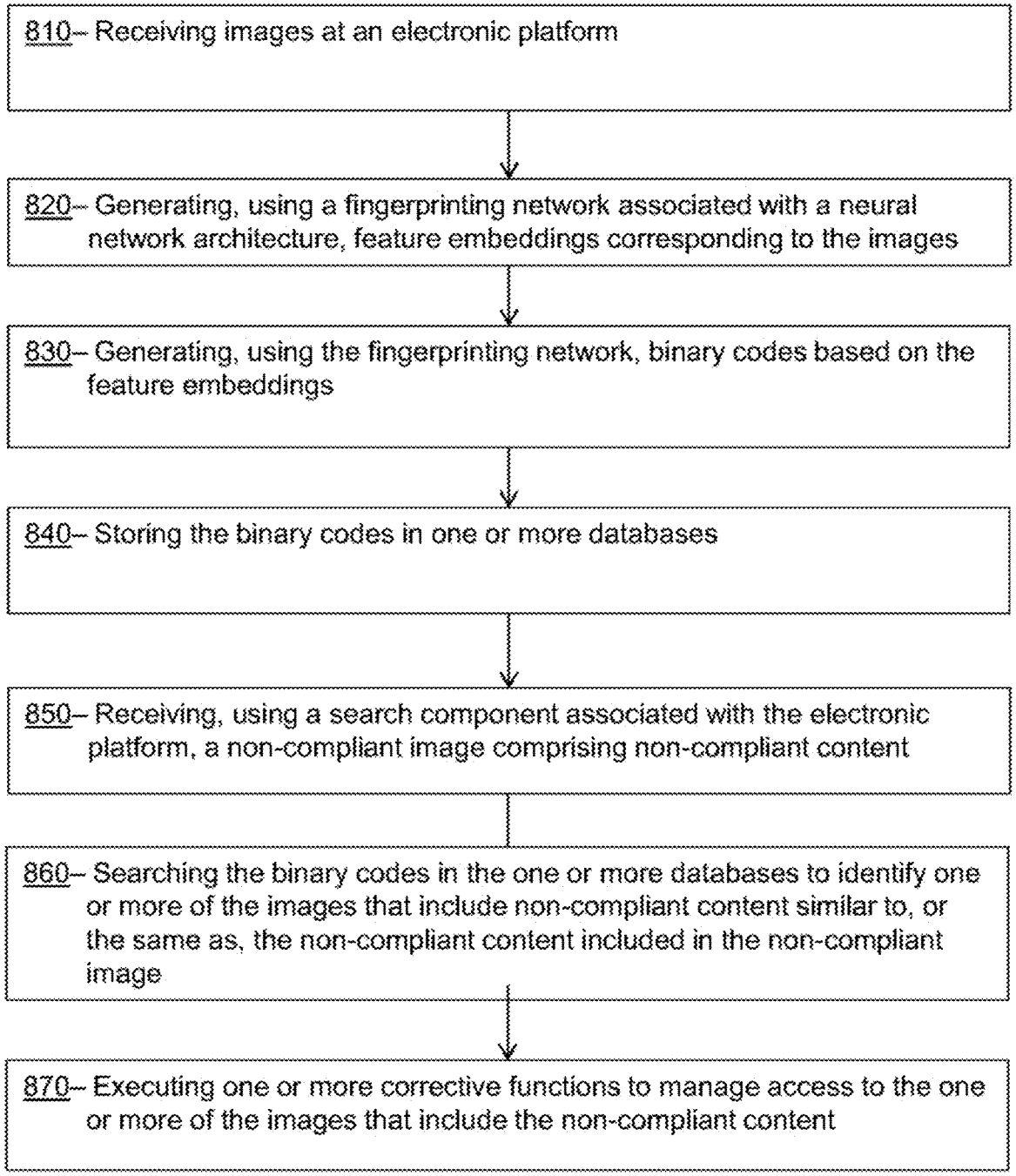
FIG. 8 illustrates a flowchart for an exemplary method according to certain embodiments.

Turning ahead in the drawings, FIG. 8 illustrates a flow chart for a method 800 according to certain embodiments. Method 800 is merely exemplary and is not limited to the embodiments presented herein. Method 800 can be employed in many different embodiments or examples not specifically depicted or described herein. In some embodiments, the activities of method 800 can be performed in the order presented. In other embodiments, the activities of method 800 can be performed in any suitable order. In still other embodiments, one or more of the activities of method 800 can be combined or skipped. In many embodiments, system 300 (FIGS. 3-4) can be suitable to perform method 800 and/or one or more of the activities of method 800. In these or other embodiments, one or more of the activities of method 800 can be implemented as one or more computer instructions configured to run at one or more processing modules and configured to be stored at one or more non-transitory memory storage modules. Such non-transitory memory storage modules can be part of a computer system such as system 300 (FIGS. 3-4), detection system 310 (FIGS. 3-4), and/or electronic platform 330 (FIGS. 3-4). The processing module(s) can be similar or identical to the processing module(s) described above with respect to computer system 100 (FIG. 1) and/or system 300 (FIGS. 3-4).

Method 800 can comprise an activity 810 of receiving images at an electronic platform.

Method 800 can further comprise an activity 820 of generating, using a fingerprinting network associated with a neural network architecture, feature embeddings corresponding to the images.

Method 800 can further comprise an activity 830 of generating, using the fingerprinting network, binary codes based on the feature embeddings.

Method 800 can further comprise an activity 840 of storing the binary codes in one or more databases.

Method 800 can further comprise an activity 850 of receiving, using a search component associated with the electronic platform, a non-compliant image comprising non-compliant content.

Method 800 can further comprise an activity 860 of searching the binary codes in the one or more databases to identify one or more of the images that include non-compliant content similar to, or the same as, the non-compliant content included in the non-compliant image.

Method 800 can further comprise an activity 870 of executing one or more corrective functions to manage access to the one or more of the images that include the non-compliant content.

As evidenced by the disclosure herein, the techniques set forth in this disclosure are rooted in computer technologies that overcome existing problems in known detection systems, specifically problems dealing with accurately identifying non-compliant images in large datasets. The techniques described in this disclosure provide a technical solution (e.g., one that utilizes various AI-based neural networking and/or machine learning techniques) for overcoming the limitations associated with known techniques. For example, the detection techniques described herein take advantage of novel AI and machine learning techniques to learn functions for extracting feature embeddings and/or binary codes from images. This technology-based solution marks an improvement over existing capabilities and functionalities related to computer systems by improving the accuracy the image identification techniques, and doing so in a rapid and efficient manner that enables non-compliant images to be identified in very large datasets.

In certain embodiments, the techniques described herein can advantageously improve user experiences with electronic platforms by quickly identifying non-compliant images within large datasets. In various embodiments, the techniques described herein can be executed dynamically in real time as images are provided to an electronic platform. In many embodiments, the techniques described herein can be used continuously at a scale that cannot be reasonably performed using manual techniques or the human mind (e.g., due to the large number of images that are provided to an electronic platform).

In many embodiments, the techniques described herein can be used continuously at a scale that cannot be reasonably performed using manual techniques or the human mind. For example, the data analyzed by the neural network architectures described herein can be too large to be analyzed using manual techniques.

Furthermore, in a number of embodiments, the techniques described herein can solve a technical problem that arises only within the realm of computer networks, because neural networks do not exist outside the realm of computer networks.

Although systems and methods have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-8 may be modified, and that the foregoing discussion of certain of these embodiments does not necessarily represent a complete description of all possible embodiments. For example, one or more of the procedures, processes, or activities of FIG. 8 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   one or more processors; and
   one or more non-transitory computer-readable media storing computing instructions that, when executed on the one or more processors, cause the one or more processors to perform operations comprising:
      receiving images, via the one or more processors, at an electronic platform;
      generating, using a fingerprinting network associated with a neural network architecture, feature embeddings corresponding to features in the images, wherein the fingerprinting network associated with the neural network architecture comprises a feature extraction component, and wherein generating the feature embeddings further comprises using the feature extraction component to generate the feature embeddings corresponding to the features in the images;
      generating, using the fingerprinting network, codes for the images, wherein the codes are based on the feature embeddings;
      storing the codes in one or more databases;
      receiving, at the electronic platform, a non-compliant image comprising non-compliant content;
      identifying the non-compliant content in the non-compliant image; and
      searching, using multi-modal search options that enable both image content and text content of the images to be searched, the codes in the one or more databases to identify one or more of the images comprising non-compliant content similar to, or same as, the non-compliant content included in the non-compliant image.

2. The system of claim 1, wherein searching the codes in the one or more databases to identify the one or more of the images further comprises:
   generating, using the fingerprinting network associated with the neural network architecture, a feature embedding corresponding to a non-compliant feature of the non-compliant image; and
   generating, using the fingerprinting network associated with the neural network architecture, a sub-code of the codes for the non-compliant image, wherein the sub-code of the codes is based on the feature embedding corresponding to the non-compliant feature of the non-compliant image; and
   wherein:
      the non-compliant content comprises inappropriate content that is determined to be at least one of: offensive, crude, hateful, or distasteful;
      the electronic platform comprises a website hosted by the electronic platform and configured to display products and services; and
      wherein the images comprise images of the products and the services.

3. The system of claim 2, wherein searching the codes in the one or more databases to identify the one or more of the images further comprises:
   comparing the sub-code of the codes stored in the one or more databases to identify the one or more of the images comprising the non-compliant content included in the non-compliant image.

4. The system of claim 1, wherein:
the feature embeddings generated for the features in the images preserve feature information of the features in the images.

5. The system of claim 4, wherein the codes are derived from the feature embeddings, at least in part, using a hyperplane hashing function.

6. The system of claim 5, wherein the hyperplane hashing function is configured to perform:
dividing embedding spaces associated with the feature embeddings using hyperplanes; and
generating the codes corresponding to the hyperplanes using a locality searching hashing function.

7. The system of claim 1, wherein an indexing function uses the codes to facilitate searches to be performed by a search engine.

8. The system of claim 1, wherein the computing instructions, when executed on the one or more processors, further cause the one or more processors to perform an operation comprising:
providing, using a search component associated with the electronic platform, one or more search interfaces for searching the codes stored in the one or more databases to identify the one or more of the images including the non-compliant content similar to, or the same as, the non-compliant content included in the non-compliant image.

9. The system of claim 8, wherein providing the one or more search interfaces further comprises:
providing a seed image that comprises the non-compliant content similar to, or the same as, the non-compliant content included in the non-compliant image;
generating one or more binary codes for the seed image utilized to search for the images comprising the non-compliant content similar to, or the same as, the non-compliant content included in the non-compliant image; and
comparing the one or more binary codes associated with the seed image with other binary codes stored in the one or more databases.

10. The system of claim 1, wherein the computing instructions, when executed on the one or more processors, further cause the one or more processors to perform an operation comprising:
executing one or more corrective functions to manage access to the one or more of the images that comprises the non-compliant content which is similar to, or the same as, the non-compliant content included in the non-compliant image.

11. A method being implemented via execution of computing instructions configured to run on one or more processors and stored at non-transitory computer-readable media, the method comprising:
receiving images, via the one or more processors, at an electronic platform;
generating, using a fingerprinting network associated with a neural network architecture, feature embeddings corresponding to features in the images, wherein the fingerprinting network associated with the neural network architecture comprises a feature extraction component, and wherein generating the feature embeddings further comprises using the feature extraction component to generate the feature embeddings corresponding to the features in the images;
generating, using the fingerprinting network, codes for the images, wherein the codes are based on the feature embeddings;
storing the codes in one or more databases;
receiving, at the electronic platform, a non-compliant image comprising non-compliant content;
identifying the non-compliant content in the non-compliant image; and
searching, using multi-modal search options that enable both image content and text content of the images to be searched, the codes in the one or more databases to identify one or more of the images comprising non-compliant content similar to, or same as, the non-compliant content included in the non-compliant image.

12. The method of claim 11, wherein searching the codes in the one or more databases to identify the one or more of the images further comprises:
generating, using the fingerprinting network associated with the neural network architecture, a feature embedding corresponding to a non-compliant feature of the non-compliant image; and
generating, using the fingerprinting network associated with the neural network architecture, a sub-code of the codes for the non-compliant image, wherein the sub-code of the codes is based on the feature embedding corresponding to the non-compliant feature of the the non-compliant image; and
wherein:
the non-compliant content comprises inappropriate content that is determined to be at least one of: offensive, crude, hateful, or distasteful;
the electronic platform comprises a website hosted by the electronic platform and configured to display products and services; and
wherein the images comprise images of the products and the services.

13. The method of claim 12, wherein searching the codes in the one or more databases to identify the one or more of the images further comprises:
comparing the sub-code of the codes stored in the one or more databases to identify the one or more of the images comprising the non-compliant content included in the non-compliant image.

14. The method of claim 11, wherein:
the feature embeddings generated for the features in the images preserve feature information of the features in the images.

15. The method of claim 14, wherein the codes are derived from the feature embeddings, at least in part, using a hyperplane hashing function.

16. The method of claim 15, wherein the hyperplane hashing function is configured to perform:
dividing embedding spaces associated with the feature embeddings using hyperplanes; and
generating the codes corresponding to the hyperplanes using a locality searching hashing function.

17. The method of claim 11, wherein an indexing function uses the codes to facilitate searches to be performed by a search engine.

18. The method of claim 11, further comprising:
providing, using a search component associated with the electronic platform, one or more search interfaces for searching the codes stored in the one or more databases to identify the one or more of the images including the non-compliant content similar to, or the same as, the non-compliant content included in the non-compliant image.

19. The method of claim 18, wherein providing the one or more search interfaces further comprises:

providing a seed image that comprises the non-compliant content similar to, or the same as, the non-compliant content included in the non-compliant image;

generating one or more binary codes for the seed image utilized to search for the images comprising the non-compliant content similar to, or the same as, the non-compliant content included in the non-compliant image; and comparing the one or more binary codes associated with the seed image with other binary codes stored in the one or more databases.

20. The method of claim 11, further comprising:

executing one or more corrective functions to manage access to the one or more of the images that comprises the non-compliant content which is similar to, or the same as, the non-compliant content included in the non-compliant image.

\* \* \* \* \*